(12) United States Patent
Conlon

(10) Patent No.: US 11,686,527 B2
(45) Date of Patent: Jun. 27, 2023

(54) CRYOGENIC LIQUID ENERGY STORAGE

(71) Applicant: PINTAIL POWER LLC, Palo Alto, CA (US)

(72) Inventor: William M Conlon, Palo Alto, CA (US)

(73) Assignee: Pintail Power LLC, Palo Alto, CA (US)

( * ) Notice: Subject to any disclaimer, the term of this patent is extended or adjusted under 35 U.S.C. 154(b) by 0 days.

(21) Appl. No.: 17/570,016

(22) Filed: Jan. 6, 2022

(65) Prior Publication Data

US 2022/0128300 A1 Apr. 28, 2022

Related U.S. Application Data

(63) Continuation of application No. 15/831,783, filed on Dec. 5, 2017, now Pat. No. 11,221,177, which is a continuation of application No. PCT/US2016/032363, filed on May 13, 2016.

(60) Provisional application No. 62/180,437, filed on Jun. 16, 2015.

(51) Int. Cl.
| | |
|---|---|
| *F25J 1/02* | (2006.01) |
| *F02C 3/22* | (2006.01) |
| *F02C 7/143* | (2006.01) |
| *F25J 1/00* | (2006.01) |

(52) U.S. Cl.
CPC ............. *F25J 1/023* (2013.01); *F02C 3/22* (2013.01); *F02C 7/143* (2013.01); *F25J 1/0012* (2013.01); *F25J 1/0045* (2013.01); *F17C 2265/05* (2013.01); *F17C 2265/07* (2013.01); *F25J 2240/80* (2013.01); *F25J 2260/60* (2013.01); *F25J 2290/62* (2013.01); *Y02E 20/16* (2013.01)

(58) Field of Classification Search
CPC ... F02C 7/143; F02C 7/185; F02C 6/16; F25J 1/0012; F25J 1/0045; F25J 1/023; F25J 2240/80
See application file for complete search history.

(56) References Cited

U.S. PATENT DOCUMENTS

| | | |
|---|---|---|
| 3,693,347 A | 9/1972 | Kydd et al. |
| 4,329,842 A | 5/1982 | Hoskinson |
| 4,760,705 A | 8/1988 | Yogev et al. |
| 5,412,938 A | 5/1995 | Keller |

(Continued)

FOREIGN PATENT DOCUMENTS

| | | |
|---|---|---|
| DE | 102009022491 A1 | 1/2011 |
| EP | 2503111 A1 | 9/2012 |

(Continued)

OTHER PUBLICATIONS

Supplementary European Search Report, EP16857980, dated May 24, 2019, 1 page.

(Continued)

*Primary Examiner* — Brian M King
(74) *Attorney, Agent, or Firm* — Schmidt Patent Law, Inc.

(57) ABSTRACT

Apparatus, systems, and methods use cryogenic liquids such as, for example, liquefied natural gas and liquefied air or liquefied air components to store thermal energy. The cryogenic liquids may be produced using electrically powered liquefaction methods, for example, using excess electric power during periods of over-generation on the electric grid.

16 Claims, 8 Drawing Sheets

(56) References Cited

U.S. PATENT DOCUMENTS

| | | | |
|---|---|---|---|
| 5,457,951 A | 10/1995 | Johnson et al. | |
| 6,038,849 A | 3/2000 | Nakhamkin et al. | |
| 6,065,280 A | 5/2000 | Ranasinghe et al. | |
| 6,474,069 B1 | 11/2002 | Smith | |
| 6,571,548 B1 | 6/2003 | Bronicki et al. | |
| 6,920,759 B2 | 7/2005 | Wakana et al. | |
| 7,305,832 B2* | 12/2007 | Fletcher | F02C 6/16 60/726 |
| 7,406,829 B2 | 8/2008 | Coffinberry | |
| 7,478,524 B2 | 1/2009 | Kreitmeier | |
| 7,770,376 B1 | 8/2010 | Brostmeyer | |
| 7,821,158 B2 | 10/2010 | Vandor | |
| 7,870,746 B2 | 1/2011 | Vandor | |
| 7,870,747 B1 | 1/2011 | Brown | |
| 8,020,404 B2 | 9/2011 | Vandor | |
| 8,036,351 B2 | 11/2011 | Vandor | |
| 8,063,511 B2 | 11/2011 | Vandor | |
| 8,329,345 B2 | 12/2012 | Koda et al. | |
| 8,907,524 B2 | 12/2014 | Vandor | |
| 2001/0004830 A1* | 6/2001 | Wakana | F25J 1/0228 60/39.182 |
| 2001/0015060 A1 | 8/2001 | Bronicki et al. | |
| 2001/0039797 A1 | 11/2001 | Cheng | |
| 2003/0005698 A1 | 1/2003 | Keller | |
| 2003/0101728 A1 | 6/2003 | Wakana et al. | |
| 2005/0126176 A1 | 6/2005 | Fletcher et al. | |
| 2005/0132746 A1 | 6/2005 | Brugerolle et al. | |
| 2005/0223712 A1 | 10/2005 | Briesch et al. | |
| 2007/0089423 A1 | 4/2007 | Norman et al. | |
| 2008/0011161 A1 | 1/2008 | Finkenrath et al. | |
| 2008/0163618 A1 | 7/2008 | Paul | |
| 2008/0302133 A1 | 12/2008 | Saysset et al. | |
| 2009/0071172 A1 | 3/2009 | VandenBussche et al. | |
| 2009/0158739 A1 | 6/2009 | Messmer | |
| 2009/0205364 A1 | 8/2009 | Enis et al. | |
| 2009/0293503 A1 | 12/2009 | Vandor | |
| 2009/0320828 A1 | 12/2009 | Koketsu et al. | |
| 2011/0072819 A1 | 3/2011 | Silva et al. | |
| 2011/0126549 A1* | 6/2011 | Pronske | F02C 7/143 60/39.12 |
| 2011/0132032 A1 | 6/2011 | Gatti et al. | |
| 2011/0226010 A1 | 9/2011 | Baxter | |
| 2011/0232545 A1 | 9/2011 | Clements | |
| 2012/0023947 A1 | 2/2012 | Kulkarni et al. | |
| 2012/0151961 A1* | 6/2012 | Ha | F25J 3/04339 62/50.3 |
| 2013/0312386 A1 | 11/2013 | Wirsum et al. | |
| 2013/0318969 A1 | 12/2013 | Zhou et al. | |
| 2014/0202157 A1 | 7/2014 | Shinnar et al. | |
| 2014/0223906 A1 | 8/2014 | Gee et al. | |
| 2015/0159555 A1 | 6/2015 | Heinrich et al. | |
| 2015/0184593 A1 | 7/2015 | Kraft et al. | |
| 2015/0184690 A1 | 7/2015 | Conlon | |
| 2015/0218968 A1 | 8/2015 | Sinatov et al. | |
| 2015/0236527 A1 | 8/2015 | Goldman | |
| 2015/0240654 A1 | 8/2015 | Goldman | |
| 2015/0263523 A1 | 9/2015 | Goldman | |
| 2018/0080379 A1 | 3/2018 | Conlon | |
| 2018/0094550 A1 | 4/2018 | Conlon | |
| 2018/0100695 A1 | 4/2018 | Conlon | |

FOREIGN PATENT DOCUMENTS

| | | |
|---|---|---|
| EP | 2610470 A2 | 7/2013 |
| EP | 2634383 A1 | 9/2013 |
| JP | 04127850 A | 4/1992 |
| JP | 2000337170 A | 12/2000 |
| WO | 2007/096656 A1 | 8/2007 |
| WO | 2011/000548 A1 | 1/2011 |
| WO | 2011/071609 A1 | 6/2011 |
| WO | 2013/116185 A1 | 8/2013 |
| WO | 2014/055307 A1 | 4/2014 |
| WO | 2015/105670 A1 | 7/2015 |
| WO | 2016/195968 A1 | 12/2016 |
| WO | 2016/204893 A1 | 12/2016 |
| WO | 2017/069922 A1 | 4/2017 |
| WO | 2017/079617 A1 | 5/2017 |

OTHER PUBLICATIONS

International Search Report corresponding to PCT/US2016/032363, dated Sep. 12, 2016, 1 page.

International Search Report corresponding to PCT/US2016/060608, dated Jan. 16, 2017, 1 page.

International Search Report corresponding to PCT/US2017/067360, dated Feb. 21, 2018, 1 page.

Supplementary European Search Report, EP1487752, dated Jun. 23, 2017, 1 page.

Gail Reitenbach, Ph.D., "The Carbon Capture and Storage r&D Frontier", http://www.powermag.com, May 1, 2015, 12 pages.

International Search Report corresponding to PCT/US2014/071561, dated Apr. 20, 2015, 2 pages.

Brian Stover, et al., "Liquid Air Energy Storage (LAES) Development Status and Benchmarking with other Storage Technologies", Power-Gen Europe 2014, Jun. 3-5, 2014, Cologne, 15 pages.

Brian Stover, et al., "Process Engineering and Thermodynamic Evaluation of Concepts for Liquid air Energy Storage", Power-Gen Europe 2013, Jun. 4-6, 2013, Vienna, 15 pages.

Yongliang Li, et al., "An integrated system for thermal power generation, electrical energy storage and CO2 capture", Int. J Energy Res. 2011; 35:1158-1167.

Centre for Low Carbon Futures 2050, "Liquid Air in the energy and transport systems Opportunities for industry and innovation in the UK, Summary Report and Recommendations", May 9, 2013, ISBN: 978-0-9575872-1-2, 32 pages.

Sylvain Quoilin et al., "Techno-economic survey for Organic Rankine Cycle (ORC) Systems", Renewable and Sustainable Energy Reviews 22 (2013) pp. 168-186.

Vankeirsbilck et al., Organic Rankine Cycle as Efficient Alternative to Steam Cycle for Small Scale Power Generation, Jul. 2011, 8th International conference on Heat Transfer, Fluid Mechanics, and Thermodynamics in Point AUx Piments, Mauritius, HEFAT2011, p. 785-792.

Z.S. Spakovsky, Unified Thermodynamics and Propulsion Notes: (I) first Law of Thermodynamics (3) first Law Applied to Engineering Cycles (3.7) Brayton Cycle (3.7.1) Brayton Cycle Efficiency, Oct. 2011, MIT, Version 6.2.

B.E. Enga and W.T. Thompson, Catalytic Combustion Applied to Gas Turbine Technology: Hight Temperature use for Metal Supported Platinum Catalysts, 2979, Platinum Metals Review, 23, (4), pp. 134-141.

International Search Report corresponding to PCT/US2016/032342, dated Jul. 11, 2016, 1 page.

International Search Report corresponding to PCT/US2016/032890, dated Jul. 22, 2016, 1 page.

International Search Report corresponding to PCT/US2016/054152, 1 page.

Park et al., A Novel Design of Liquefied Natural Gas (LNG) Regasification Power Plant Integrated with Cryogenic Energy Storage System, Ind. Eng. Chem. Res. 2017, 56 pp.

* cited by examiner

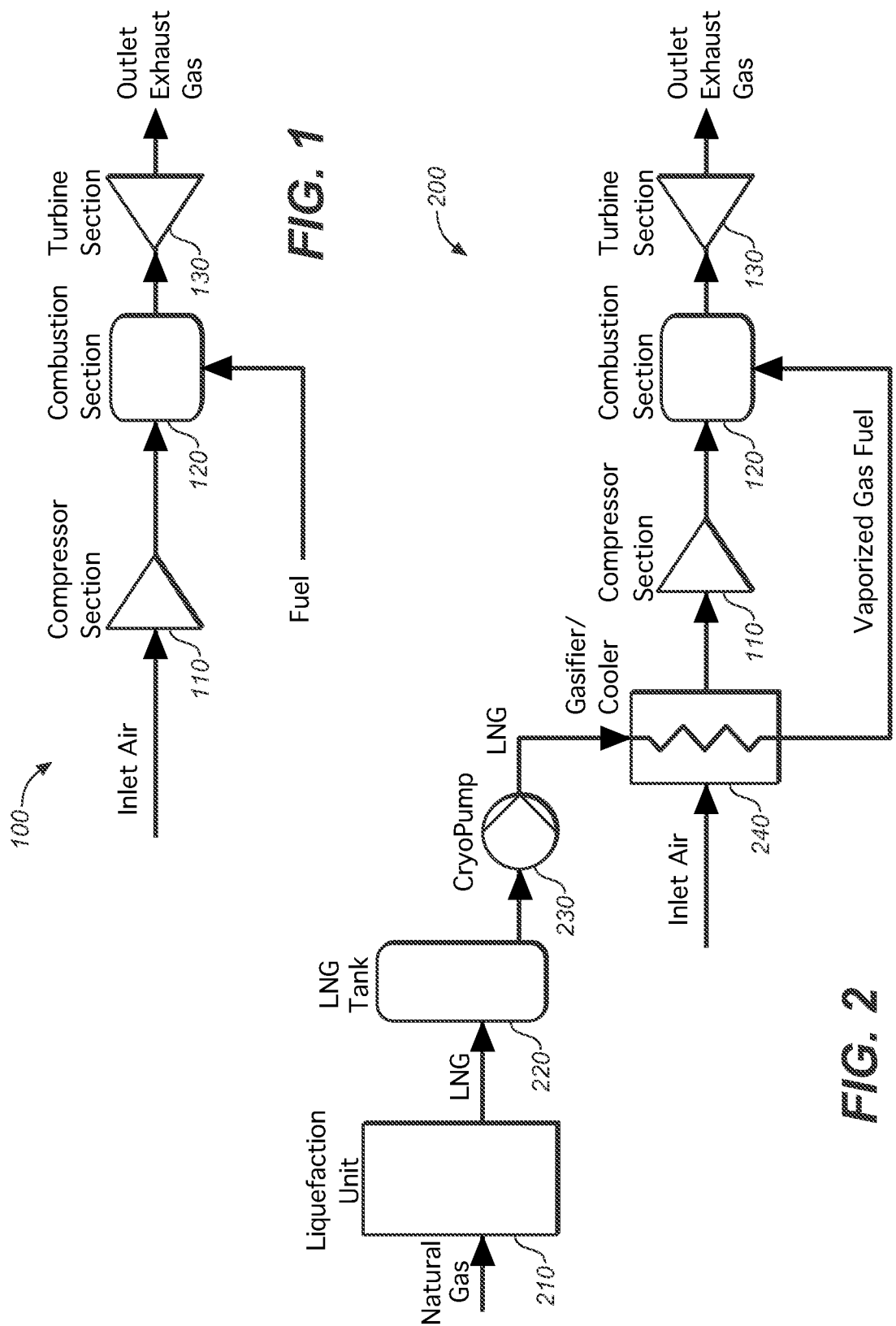

CRYOGENIC LIQUID ENERGY STORAGE

CROSS REFERENCE TO RELATED APPLICATIONS

This application is a continuation of U.S. patent application Ser. No. 15/831,783 titled "Cryogenic Liquid Energy Storage" and filed Dec. 5, 2017, which is a continuation of International Patent Application No. PCT/US16/32363 titled "Cryogenic Liquid Energy Storage" and filed May 13, 2016. PCT/US16/32363 claims benefit of priority to U.S. Provisional Patent Application No. 62/180,437 titled "Cryogenic Liquid Energy Storage" and filed Jun. 16, 2015. Each of the applications referenced in this paragraph is incorporated herein by reference in its entirety.

FIELD OF THE INVENTION

The invention relates generally to apparatus, systems, and methods for using cryogenic liquids such as, for example, liquefied natural gas, liquefied air, or liquefied air components to store thermal energy.

BACKGROUND

Energy storage is needed to aid the integration of renewable power, which is inherently intermittent in nature. This intermittency causes two problems which can be solved with energy storage: over-generation when too much renewable power is available, and under-generation, when too little renewable power is available. Without energy storage, combustion turbine generator peaking plants must be kept in reserve to make up for under-generation, but the excess generation would be lost. Also the peaking plants are relatively inefficient, resulting in higher costs and emissions of greenhouse gases, undoing some of the benefit of renewable power.

SUMMARY

In one aspect, a method of recovering stored energy comprises regasifying liquid natural gas to gaseous form by heat exchange with inlet air to the compressor section of a heat engine, thereby cooling the inlet air, compressing the inlet air with the compressor and introducing the compressed inlet air into a combustor, introducing the gasified natural gas into the combustor and combusting it with the compressed inlet air to form a hot gaseous working fluid, and expanding the hot gaseous working fluid through a turbine. The method may also comprise liquefying the natural gas for storage before subsequently regasifying it as just described.

In another aspect, a method of recovering stored energy comprises regasifying liquid air or liquid air components by heat exchange with inlet air to a compressor, thereby cooling the inlet air, compressing the inlet air with the compressor and introducing the compressed inlet air into a combustor, introducing the regasified liquid air or liquid air components into the combustor, introducing a fuel into the combustor and combusting it with the compressed inlet air and with the regasified liquid air or liquid air components to form a hot gaseous working fluid, and expanding the hot gaseous working fluid through a turbine. The method may also comprise liquefying the air or air components for storage before subsequently regasifying the liquid air or liquid air components as just described. The fuel may be, for example, natural gas, regasified liquefied natural gas, another gaseous fuel, a liquid fuel, or a solid fuel.

In another aspect, a method of recovering stored energy comprises regasifying liquid air or liquid air components to produce gaseous air or gaseous air components using heat from exhaust gas from a first turbine, regasifying liquid natural gas to produce gaseous natural gas using heat from exhaust gas from the first turbine, combusting the gaseous natural gas with the gaseous air or gaseous air components to form a gaseous primary working fluid at an elevated temperature, and expanding the primary working fluid through the first turbine. The method may also comprise liquefying the natural gas, air, or air components for storage before subsequently regasifying them as just described.

The method may comprise heating a secondary working fluid with heat from the first turbine exhaust gas to convert the secondary working fluid from a liquid to a gas phase, expanding the gaseous secondary working fluid through a second turbine, and condensing the secondary working fluid from gas phase to liquid phase by transferring heat from the secondary working fluid to the liquid natural gas and to the liquid air or liquid air components during regasification of the liquid natural gas and regasification of the liquid air or liquid air components. The secondary working fluid may be an organic working fluid, for example.

In another aspect, a method of recovering stored energy comprises regasifying liquid air or liquid air components by heat exchange with inlet air to a compressor, thereby cooling the inlet air, compressing the inlet air with the compressor and introducing the compressed inlet air into a first combustor, introducing a fuel into the first combustor and combusting it with the compressed inlet air to form a first hot gaseous working fluid, expanding the first hot gaseous working fluid through a first turbine, introducing the regasified liquid air or liquid air components into a second combustor, introducing a fuel into the second combustor and combusting it with the regasified liquid air or regasified liquid air components to form a second hot gaseous working fluid, and expanding the second hot gaseous working fluid through a second turbine. The method may also comprise liquefying the air or air components for storage before subsequently regasifying the liquid air or liquid air components as just described. The fuels used in the first and second combustor may be the same or different, and may be for example, natural gas, regasified natural gas, another gaseous fuel, a liquid fuel, or a solid fuel.

In another aspect, a method of recovering stored energy comprises regasifying liquid air or liquid air components by heat exchange with inlet air to a compressor, thereby cooling the inlet air, compressing the inlet air with the compressor and introducing the compressed inlet air into a combustor, introducing a fuel into the combustor and combusting it with the compressed inlet air to form a hot gaseous working fluid, expanding the hot gaseous working fluid through a turbine, further heating the regasified liquid air or liquid air components with heat from exhaust gas from the turbine, and expanding the heated regasified liquid air or liquid air components through at least one stage of expansion in an engine. The method may also comprise liquefying the air or air components for storage before subsequently regasifying the liquid air or liquid air components as just described. The fuel may be, for example, natural gas, regasified natural gas, another gaseous fuel, a liquid fuel, or a solid fuel.

In another aspect, a method of recovering stored energy comprises regasifying liquid air or liquid air components to produce gaseous air or gaseous air components using heat from exhaust gas from a turbine, expanding the regasified liquid air or liquid air components through at least one stage of expansion in an engine, mixing the expanded regasified liquid air or liquid air components with inlet air to a compressor to form an air mixture, compressing the air mixture with the compressor and introducing the compressed air mixture into a combustor, introducing a fuel into the combustor and combusting it with the compressed air mixture to form a hot gaseous working fluid, and expanding the hot gaseous working fluid through the turbine. The method may also comprise liquefying the air or air components for storage before subsequently regasifying the liquid air or liquid air components as just described. The fuel may be, for example, natural gas, regasified natural gas, another gaseous fuel, a liquid fuel, or a solid fuel.

In any of the methods summarized above the cryogenic liquids (liquefied natural gas, liquid air, or liquid air components) may be produced using off-peak or low cost electricity and stored for later generation of electric power with the turbines and/or engines employed in the methods, thereby in effect storing electric power.

These and other embodiments, features and advantages of the present invention will become more apparent to those skilled in the art when taken with reference to the following more detailed description of the invention in conjunction with the accompanying drawings that are first briefly described.

BRIEF DESCRIPTION OF THE DRAWINGS

FIG. 1 shows a block diagram of a combustion turbine generator comprising a compressor, a combustor, and a turbine.

FIG. 2 shows a block diagram of an example cryogenic liquid energy storage system incorporating the combustion turbine generator of FIG. 1. In this example liquid natural gas is regasified by cooling inlet air to the compressor, and the regasified natural gas is provided as fuel to the combustor where it is combusted with compressed air from the compressor.

DETAILED DESCRIPTION

Figure 3A:
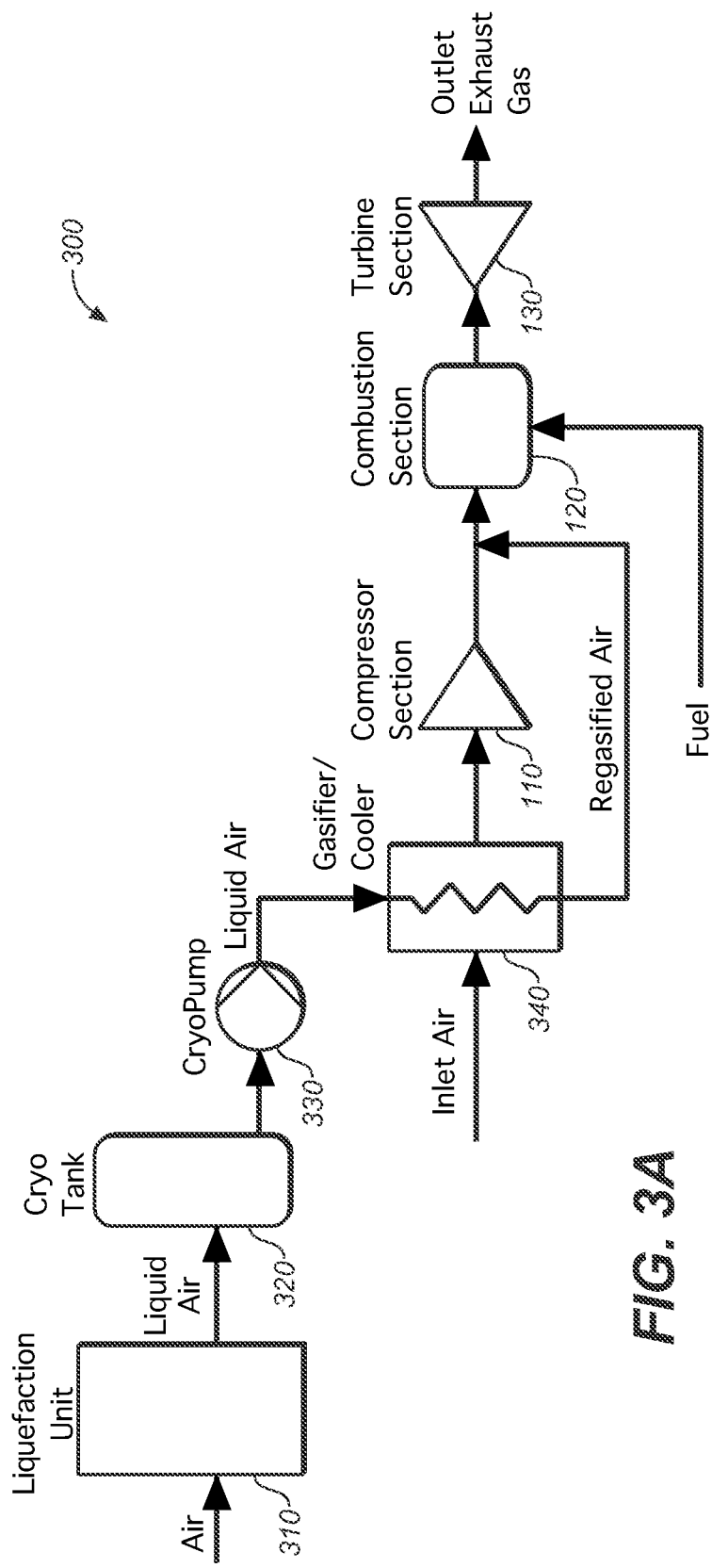
FIG. 3A shows a block diagram of another example cryogenic liquid energy storage system incorporating the combustion turbine generator of FIG. 1. In this example liquid air is regasified by cooling inlet air to the compressor, and the regasified air is introduced into the turbine gas path to augment power production.

The following detailed description should be read with reference to the drawings, in which identical reference numbers refer to like elements throughout the different figures. The drawings, which are not necessarily to scale, depict selective embodiments and are not intended to limit the scope of the invention. The detailed description illustrates by way of example, not by way of limitation, the principles of the invention. This description will clearly enable one skilled in the art to make and use the invention, and describes several embodiments, adaptations, variations, alternatives and uses of the invention, including what is presently believed to be the best mode of carrying out the invention. As used in this specification and the appended claims, the singular forms "a," "an," and "the" include plural referents unless the context clearly indicates otherwise.

This specification discloses apparatus, systems, and methods for using cryogenic liquids such as, for example, liquefied natural gas (LNG) and liquefied air or liquefied air components (e.g., liquid Nitrogen) to store thermal energy. The cryogenic liquids may be produced using electrically powered refrigeration systems, for example, using excess electric power during periods of over-generation on the electric grid. The stored thermal energy can later be extracted in fossil fuel fired power plants such as, for example, combustion turbine generator (CTG) peaking power plants, Combined Cycle power plants incorporating one or more CTGs in combination with a heat recovery steam generator and steam turbine generator (STG), and Liquid Air Power & Storage (LAPS) systems as described, for example, in U.S. patent application Ser. No. 14/546,406 titled "Liquid Air Power and Storage" filed Nov. 18, 2014; U.S. Provisional Patent App. No. 62/169,172 titled "Part Load Operation of Liquid Air Power and Storage System" filed Jun. 1, 2015; and U.S. Provisional Patent App. No. 62/170,377 titled "Liquid Air Power and Storage with Carbon Capture" filed Jun. 3, 2015, each of which is incorporated herein by reference in its entirety. Hence, in effect the apparatus, systems, and methods disclosed in this specification may provide for storing electric power from the grid and then subsequently delivering it back to the grid, and may therefore address both the under and over generation aspects of renewable power integration with the electric grid.

Further, the apparatus, systems, and methods disclosed herein may increase the reliability of fossil fuel fired power plants by securing their fuel supplies, increase the efficiency of power generation equipment, increase the power output of power plants, and/or facilitate integration of renewable energy by integrating energy storage capability at gas-fired power plants. These apparatus, systems, and methods may be suitable for use with any gas-fueled power plants, and may be particularly appropriate for natural gas fired CTGs including those employed in Combined Cycle applications and also those employed in LAPS systems.

The performance of CTG based power plants may be increased by exploiting the cold cryogenic liquid to cool the CTG inlet air, thereby increasing the mass flow and power output. This may be particularly valuable on hot summer days, when peaking power plants are most needed and most affected by ambient conditions. FIG. 1 shows a conventionally configured CTG 100 comprising a compressor section 110, a combustion section 120 (also referred to herein as a combustor or a burner), and a turbine section 130. The compressor section raises the pressure of the inlet air, the high pressure air is mixed with fuel and heated by combustion in the combustor, and the resulting hot gas expands across the turbine to produce work. Most of the work is used to drive the compressor, with the remaining useful work being delivered to a generator or other load. The performance of CTGs is typically rated at ISO standard conditions for the inlet air (60% Relative Humidity, 15° C. Temperature, and 101.325 kPa Pressure). Performance (power output and efficiency) decreases at higher elevations or ambient temperatures because the air density and hence mass flow through the machine decrease. Accordingly, inlet air cooling using cryogenic liquids as described herein may improve performance.

Referring now to FIG. 2, an example cryogenic liquid energy storage system 200 in which LNG cools inlet air to a CTG comprises a natural gas liquefaction unit 210 that extracts natural gas from a pipeline, liquefies the natural gas, and stores the LNG in one or more LNG tanks 220. Cryopump 230 pumps LNG from tanks 220 to and through gasifier 240, where heat exchange between the LNG and inlet air to compressor 110 cools the inlet air and heats and evaporates the LNG. The vaporized natural gas from gasifer 240 enters combustor 120 where it is combusted with compressed air from compressor 110 to produce hot gases that expand across turbine 130 to generate power. The LNG may be produced, for example, using off-peak or low-cost electric power, and stored for later use as a cooling and fuel source for generating electric power during an on-peak period where the cost of power and demand for power is higher.

A cooling loop, not shown, may be used to transfer heat indirectly from the inlet air to a heat transfer fluid, such as a low freezing point "coolanol" for example, and then to the LNG to vaporize the fuel. To further improve CTG efficiency, the vaporized LNG may be further heated using heat transferred from lubrication oil coolers, or from the CTG outlet exhaust gas.

By way of example, the performance of a General Electric LM6000 SPRINT PC CTG was estimated at the ISO rating condition, with 40° C. inlet air temperature as might occur on a hot summer day, and with inlet air cooling as illustrated in FIG. 2. The estimate assumes:
constant volumetric flow at the compressor section inlet, which is appropriate since the compressor is constant speed, determined by the grid frequency, with adjustments for the number of generator poles and the ratio of any intermediate gearbox.
choked flow condition through the turbine section, which means the pressure drop across the turbine is proportional to its volumetric flow rate. As the compressor inlet temperature increases, the turbine mass flow and pressure ratio decrease, resulting in higher exhaust gas temperature, which reflects less work being done by the turbine, and hence less power output.
fixed turbine inlet temperature, limited by metallurgical lifetime of the components in the hot gas path. Efficiency is proportional to temperature, so it is desired to operate at this maximum temperature.
The turbine and compressor behave as a single-shaft machine, neglecting the pressure rise/drop behavior of the 'core' compressor-turbine of the LM6000, which operates at variable speed with aerodynamic coupling to the fixed speed compressor-turbine. This accurately represents single-shaft machines, and is illustrative of multi-shaft CTGs.

The estimated performance of the CTG is tabulated in Table 1 below under the heading "Cooled by LNG". With the use of LNG for inlet air cooling, the compressor inlet temperature would be reduced from 40° C. to about 22.5° C., thereby increasing the mass flow through the CTG to increase power output, pressure ratio and efficiency. In particular, the power output would be increased by about 5.14 MW, and the fuel consumption increases by about 10.9 MW to heat the additional mass of air due to the inlet cooling. This is a marginal efficiency of 47.2%, more than the base design efficiency, illustrating why CTG inlet air cooling as disclosed herein may be advantageous.

In the process of cooling the compressor inlet air, the evaporating LNG absorbs about 2.14 MW of thermal energy. Liquefaction of LNG has a coefficient of performance of about 0.5, so production of that LNG would consume about 4.5 MW, in addition to the added fuel consumption. As noted above, lower cost electricity may be used to produce the LNG. Off-peak electricity might cost about $30/MWh in North America, so the cost of liquefying one hour of fuel would be about $135. The natural gas fuel might cost about $4 per Million Btu (Higher Heating Value), which is equivalent to 13.65 $/MWh, so the hourly fuel consumption is approximately $149. So the cost of producing an incremental 5.14 MWh is $284, for a marginal power cost of $55.25/MWh. On-peak power prices typically exceed this cost by quite substantial margins, so inlet air cooling by means of the present invention may be quite profitable. Pumping liquid natural gas to the pressure required for combustion would also require less power than compressing the natural gas.

An operator of peaking power plants may realize additional economic benefits from employing inlet air cooling as just described, including:
assuring capacity payments, which might be lost without a secure fuel supply.
securing fuel at more favorable prices (fuel arbitrage) by avoiding peak fuel demand periods.
participating in emerging energy storage markets.
supplying LNG fuel, for example to the long-haul transportation markets, in addition to electricity sales.

With low ambient temperatures, the use of inlet air for regasifying the LNG may be constrained by the CTG torque limit, in which case another source of heat may be supplied to regasify the LNG. Auxiliary heat could be provided, for example, by CTG exhaust gas, component cooling loops, such as for lubricating oil, or by a small auxiliary burner meant for regasification and black start. The LNG could therefore provide a secure fuel source under all ambient conditions.

FIG. 3A shows an example cryogenic liquid energy storage system 300 in which liquefied air or liquefied air components are used for inlet air cooling and power augmentation of a CTG. In this example, the system comprises an air liquefaction unit 310 that liquefies air or air components and stores the liquefied air or liquefied air components in one or more tanks 320. Cryopump 330 pumps liquid air or liquid air components from tanks 320 to and through gasifier 340, where heat exchange between the liquid air or liquid air components and inlet air to compressor 110 cools the inlet air and regasifies the liquid air or liquid air components. The high pressure re-gasified air is mixed with the air from the compressor section and combusted with the fuel in combustor 120. Hot gas produced in the combustor comprising the compressed inlet air, the regasified air, and the products of combustion expand through the turbine section to produce power. Typically, the turbine section is limited by the hot gas temperature, so the additional air flow permits additional fuel flow for added power.

The liquid air or liquid air components may be produced, for example, using off-peak or low-cost electric power, and stored for later use for cooling and then mixing with the working fluid to generate electric power during an on-peak period when the cost of power and demand for power is higher.

Figure 3B:
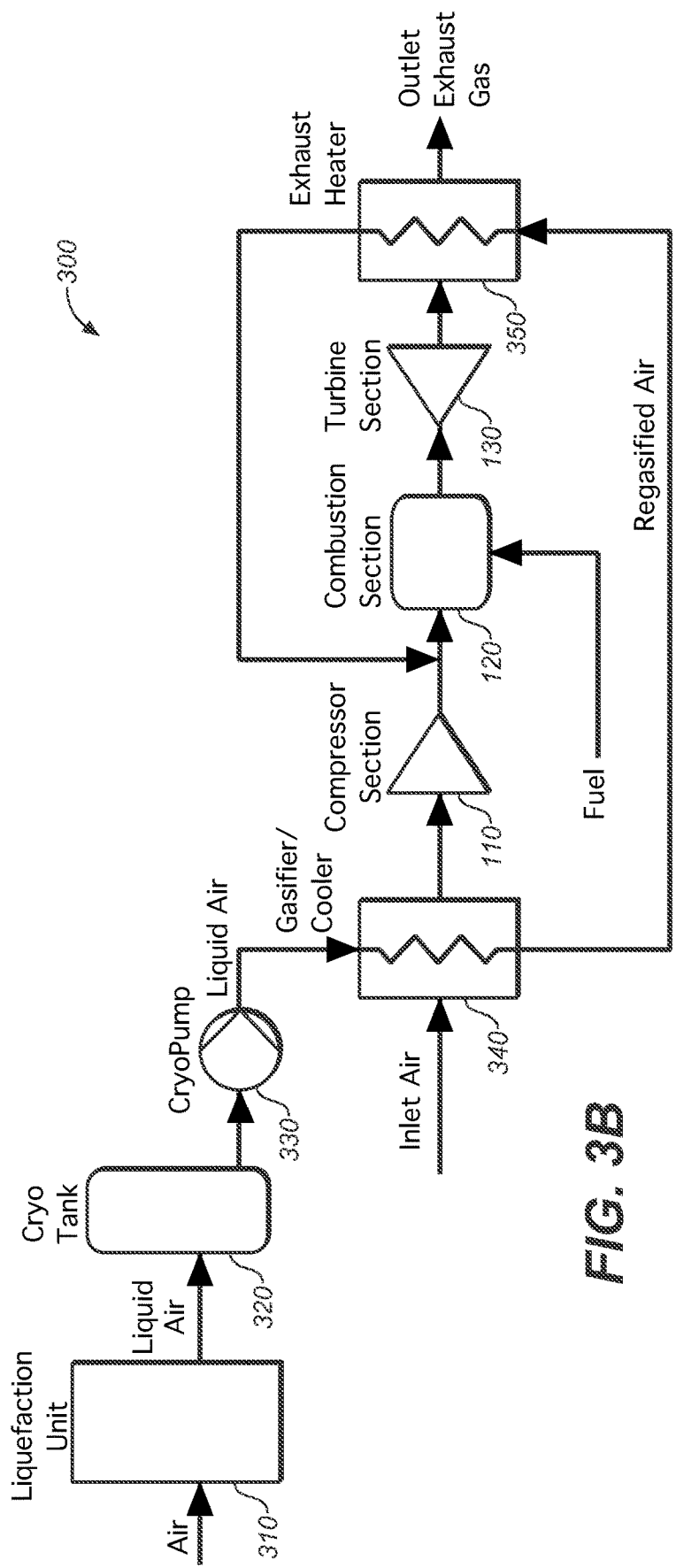
FIG. 3B shows a block diagram of another example cryogenic liquid energy storage system incorporating the combustion turbine generator of FIG. 1 similarly to the example of FIG. 3A. In the example of FIG. 3B the regasified air is further heated by turbine exhaust before being introduced into the turbine gas path to augment power production.

In some variations, as illustrated in FIG. 3B for example, after cooling the inlet air the regasified air may be further heated by exhaust gas from the combustion turbine (e.g., in heater 350 as shown) before being injected into the combustor. This may improve efficiency. In such variations, it may be desirable to match the temperature exiting the compressor section of the combustion turbine in order to avoid any thermal stress issues.

Still referring to FIGS. 3A-3B, regasified air may be introduced into the CTG gas path at any appropriate location, for example at compressor bleed ports, compressor discharge flanges, steam injection ports, or into the combustor via fuel nozzles. Regasified air, which is at much lower temperature than compressor discharge air, can be especially useful for hot gas path cooling, and may permit still more fuel to be consumed, to further increase temperature, power output and efficiency.

The quantity of liquid air or liquid air components through gasifier 340 is constrained by the turbine torque limit, which may be approached as the mass flow is increased. Another constraint is the compressor surge margin, which is the difference between the operating point and the pressure ratio at which the compressor begins to stall. CTGs are typically designed with 10 to 15% of surge margin, which permits additional flow through the turbine section. Surge margin is also increased by cooling the inlet air, so using liquid air for cooling and injection into the turbine section will be acceptable, within limits.

By way of example, the performance of a General Electric LM6000 SPRINT PC CTG was estimated at the ISO rating condition, with 40° C. inlet air temperature, and with inlet air cooling as illustrated in FIG. 3A. The estimated performance of the CTG is tabulated in Table 1 below under the heading "Cooled by Liquid Air". Using about 7.3 kg/s of liquid air for inlet air cooling would reduce the compressor inlet temperature from 40° C. to about 15° C., thereby restoring the mass flow through the CTG to the ISO rating conditions. In the process of cooling the compressor inlet air, the evaporating Liquid Air absorbs about 3.15 MW of thermal energy. The additional mass flow from inlet cooling and injection of regasified air increases the power output dramatically. The power output would be increased by about 14.8 MW over the uncooled case, while the fuel consumption increases by about 23 MW, which is a marginal efficiency of 57%. The compressor pressure ratio increase consumes about 6% of the surge margin, which should be practical for many CTGs.

Liquid air can be produced for about 0.4 kWh per kg, so production of the 7.3 kg/s of liquid air cited above would consume about 10.51 MW. As noted above, lower cost electricity may be used to produce the liquid air. Off-peak electricity might cost about $30/MWh in North America, so the cost of liquefying liquid air would be about $315 per hour of inlet cooling. The natural gas fuel might cost about $4 per Million Btu (Higher Heating Value), which is equivalent to 13.65 $/MWh, so the additional hourly fuel consumption, compared to the uncooled case is approximately $92/h. So the cost of producing the incremental 14.8 MW is $407, for a marginal power cost of $27.52/MWh, which is less than the marginal fuel cost of the CTG at the ISO condition, and comparable to base-load coal-fired generators.

Figure 4:
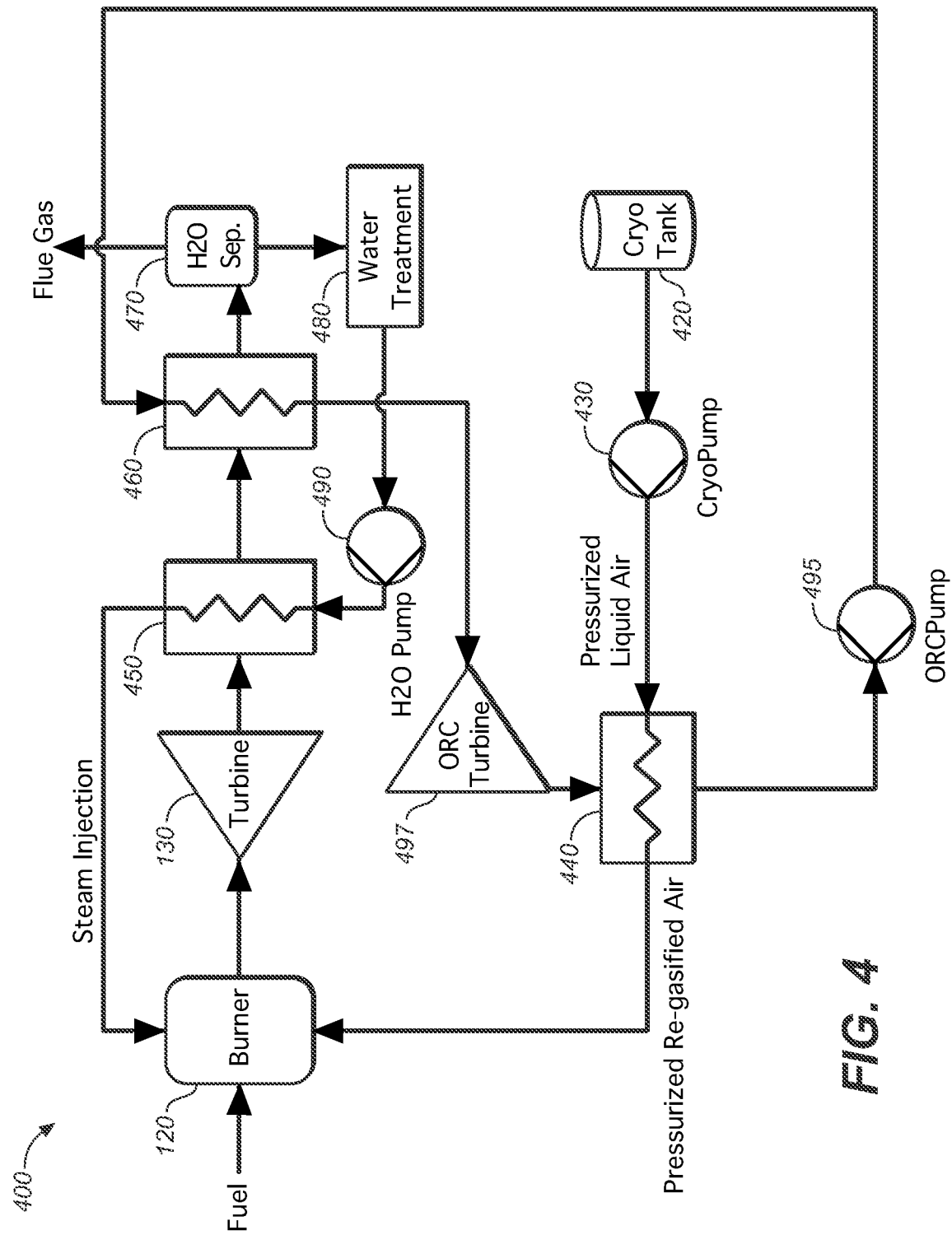
FIG. 4 shows a block diagram of an example Liquid Air Power and Storage (LAPS) system incorporating a combustion turbine generator including a combustor and a turbine but lacking a compressor. Liquid air is regasified using heat from the turbine exhaust gas, and then introduced into the combustor at high pressure and combusted with a fuel.

FIG. 4 shows an example LAPS system 400. In the illustrated example, system 400 includes an organic Rankine cycle (ORC) bottoming cycle and steam injection for power augmentation of the upper cycle, but these subsystems are optional. LAPS systems can be deployed with or without steam injection and with or without a bottoming cycle.

Still referring to FIG. 4, to store thermal energy electric power is used to cool air or air components (e.g., oxygen and nitrogen) to cryogenic temperatures for storage in one or more cryotanks 420. During operation of LAPS system 400 to discharge the stored thermal energy, liquid air or one or more liquid air components is pumped by cryopump 430 at high pressure from cryotanks 420 to and through gasifier 440, where heat exchange between the liquid air or liquid air components and the exhaust from the bottoming cycle turbine regasifies the liquid air or liquid air components and condenses water vapor from the bottoming cycle exhaust. The regasified air (or one or more regasified air components) is mixed with fuel and (optionally) steam in burner 120, and the resulting hot combustion gases expand through turbine 130 to generate power. The exhaust from the combustion turbine flows across a heat recovery steam generator 450 to make steam for injection into the burner, and then across a heat recovery organic vapor generator 460 to drive the ORC bottoming cycle. Water condensed from the turbine exhaust is separated from the flue gas by water separator 470 and treated in water treatment system 480, then recycled to and through heat recovery steam generator 450 by pump 490.

LAPS system 400 includes an organic Rankine bottoming cycle that extracts heat from the combustion turbine exhaust gas. In this bottoming cycle, gasifier 440 condenses a low pressure gaseous organic secondary working fluid to produce a low pressure liquid organic working fluid by heat exchange with liquid air or one or more liquid air components, as described above. Organic liquid pump 495 then pumps the liquid organic working fluid to higher pressure and through heat recovery organic vapor generator 460, which vaporizes the liquid organic working fluid to provide a high pressure gas that expands through ORC turbine 497 to generate additional power. The low pressure organic vapor exhaust from ORC turbine 497 is then recycled through gasifier 440.

Figure 5:
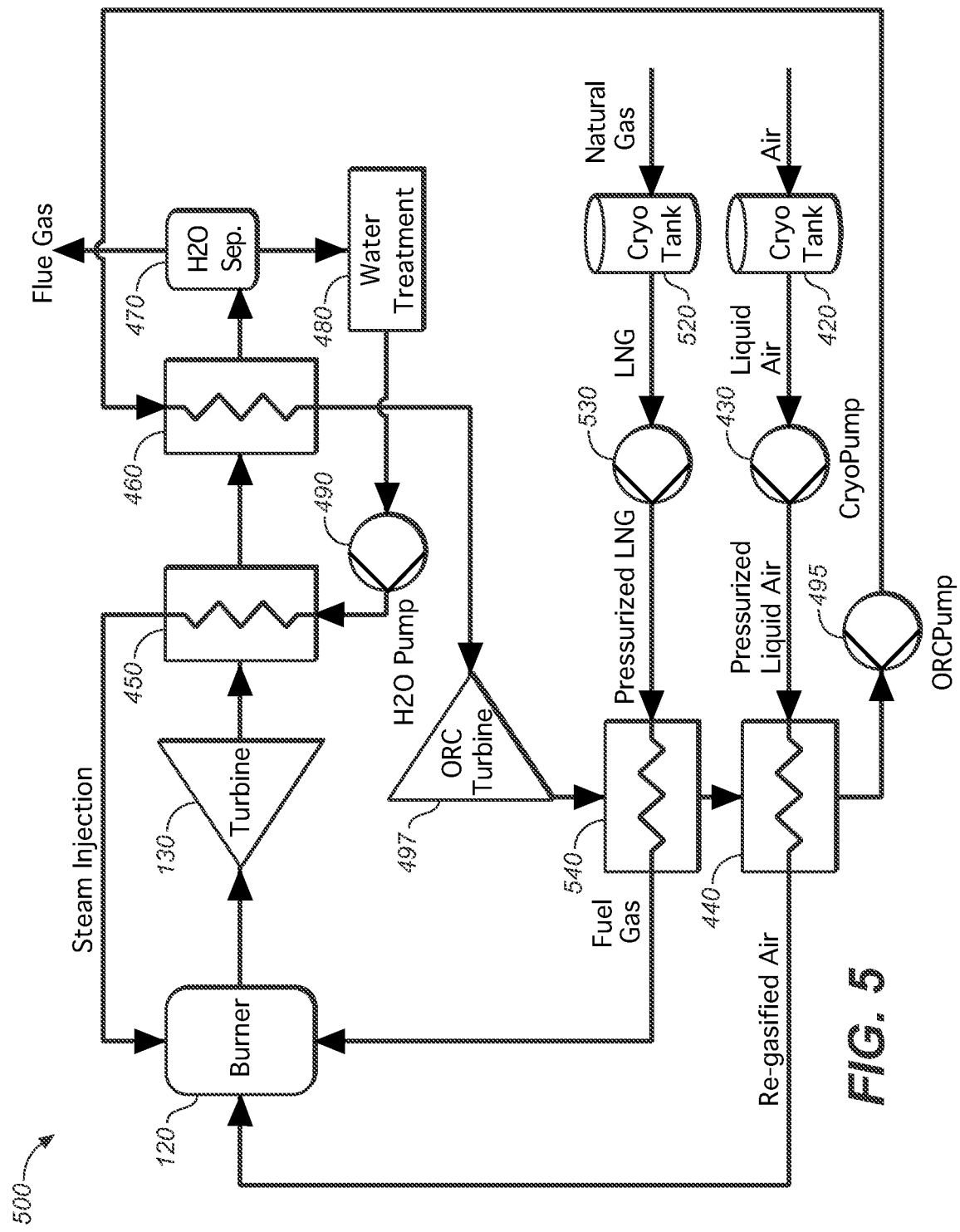
FIG. 5 shows a block diagram of an example LAPS system similar to that of FIG. 4, in which liquid air and liquid natural gas are regasified using heat from the turbine exhaust gas and then mixed and combusted in the combustor.

In addition to storing thermal energy in liquid air, a LAPS system may also store thermal energy in LNG produced, for example, using low cost or excess electric power, similarly to as described above for conventional CTGs. When needed, the LNG can be re-gasified using heat from any of many different locations in the LAPS cycle. In the example LAPS system 500 illustrated in FIG. 5, LNG stored in cryotank 520 is pumped by cryopump 530 to and through gasifier 540, where heat exchange between the LNG and the exhaust from the bottoming cycle turbine regasifies the LNG and cools the bottoming cycle exhaust. The vaporized natural gas from gasifer 540 is mixed with regasified liquid air and (optionally) steam in burner 120, and the resulting hot combustion gases expand through turbine 130 to generate power. Using LNG in a LAPS system as just described provides additional cooling for the bottoming cycle, allowing a higher flow of ORC working fluid to increase power extraction by the ORC turbine. In this arrangement, the regasified air may be cooler than in the variation illustrated in FIG. 4, in which case the fuel flow could be increased to maintain the upper cycle's turbine inlet temperature.

Storing LNG at a power plant improves the dispatchability of CTG and LAPS peaking plants, by assuring the availability of fuel for when peaking power is needed. Natural gas can be stored as 'line pack' in gas pipelines, by increasing the pressure, but fluctuations in demand due to both hot and cold ambient conditions can reduce availability of fuel. Also, because the demand for peaking plants is not known in advance, the operators may not secure long-term supply agreements, and instead purchase fuel on the spot market. Often there are "tolling arrangements" with the "off-takers" which purchase the electric power, which make operators indifferent to fuel cost. Nevertheless, when insufficient fuel is available for peaking plants, both grid reliability and the Capacity Payments essential for commercial viability of peaking power plants is endangered. By liquefying natural gas and storing it, the fuel supply is secured, potentially at lower cost, and the peaking plant can be assured of meeting Capacity obligations.

Figure 6:
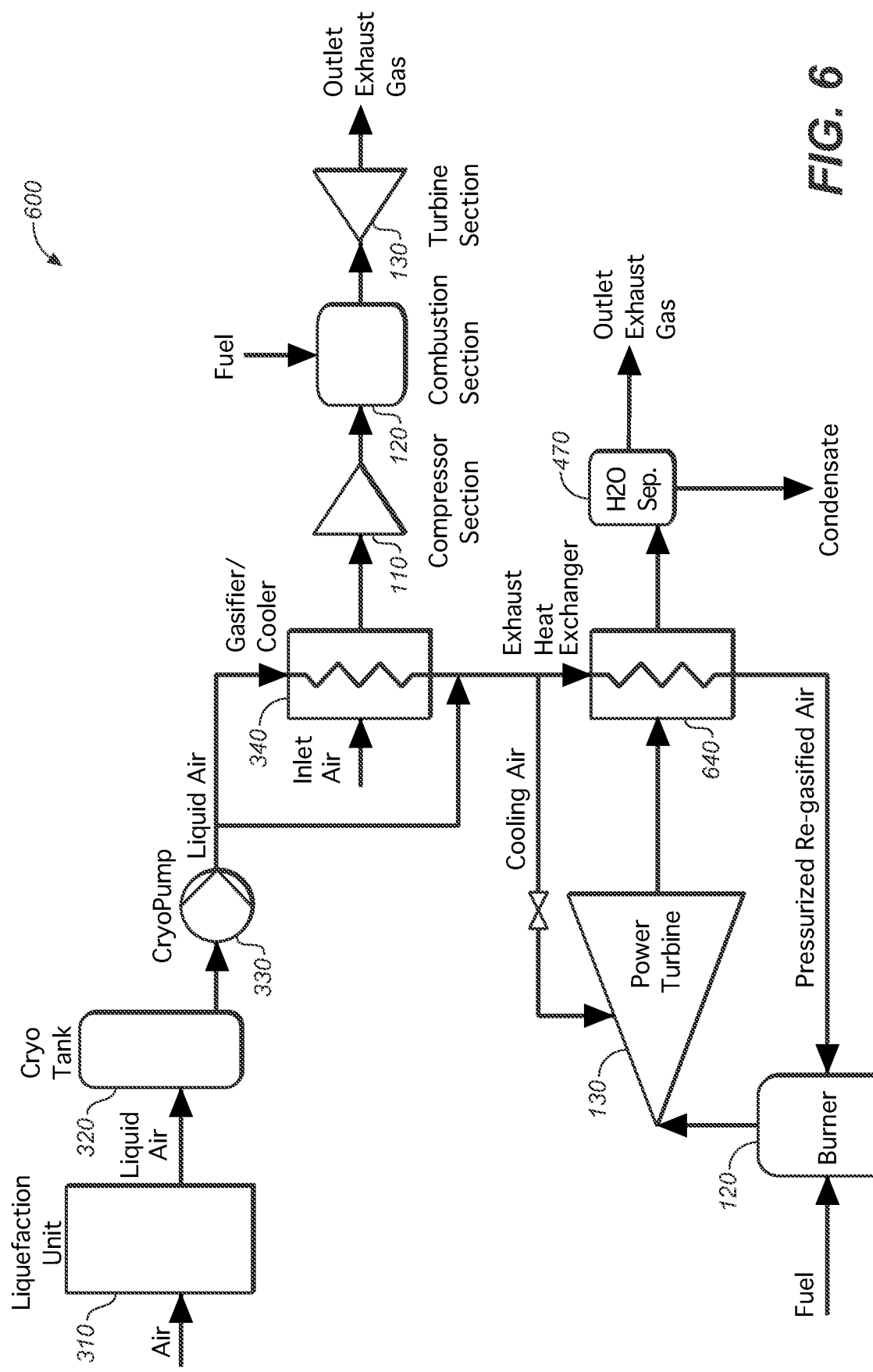
FIG. 6 shows a block diagram of an example cryogenic liquid energy storage system in which liquid air or liquid air components gasified by inlet air cooling of a combustion turbine (e.g., as shown in FIGS. 3A-3B) is fed to a separate turbine in a LAPS system (e.g., as shown in FIG. 4 but lacking the bottoming cycle and steam injection).

Cryogenic liquid energy storage may be used with conventional combustion turbines deployed in combination with LAPS systems. In some variations, some or all of the liquid air gasified by inlet air cooling of a conventional combustion turbine, as described with respect to FIGS. 3A-3B for example, may be fed to a separate turbine in a LAPS system (e.g., as configured in FIG. 4 with or without a bottoming cycle and steam injection) for power generation. FIG. 6 shows a block diagram of an example cryogenic liquid energy storage system 600 of this type, in which liquid air is regasified by inlet air cooling of a conventional combustion turbine, further heated in exhaust heat exchanger 640 using heat from a LAPS turbine exhaust, and then combusted with fuel in the LAPS burner to drive the LAPS turbine. Liquid air regasified by inlet air cooling may optionally be mixed with additional liquid air that bypassed the inlet air cooling, as shown. Optionally, a portion of the regasified liquid air stream may be split off before heat exchanger 640 and used to cool components in the hot gas path through the LAPS turbine, as shown.

Cryogenic liquid energy storage systems combining inlet air cooling of a conventional combustion turbine with a LAPS system may use multiple combustion turbines (e.g., in peaking plants) with inlet air cooling/liquid air gasification, and then combine the gasified liquid air to feed a single LAPS system. This may be a commercially attractive approach for combustion turbines that cannot readily accept additional compressed air (because there is no port, for example, or because there is inadequate compressor surge margin). Peaking plants often are installed with multiple units, and may for example be refit for inlet air cooling/liquid air gasification for six units, for example, all of which feed gasified liquid air to a single LAPS system. In such a case the LAPS system may be a replacement for a (e.g., seventh) combustion turbine unit in the peaking plant.

Figure 7:
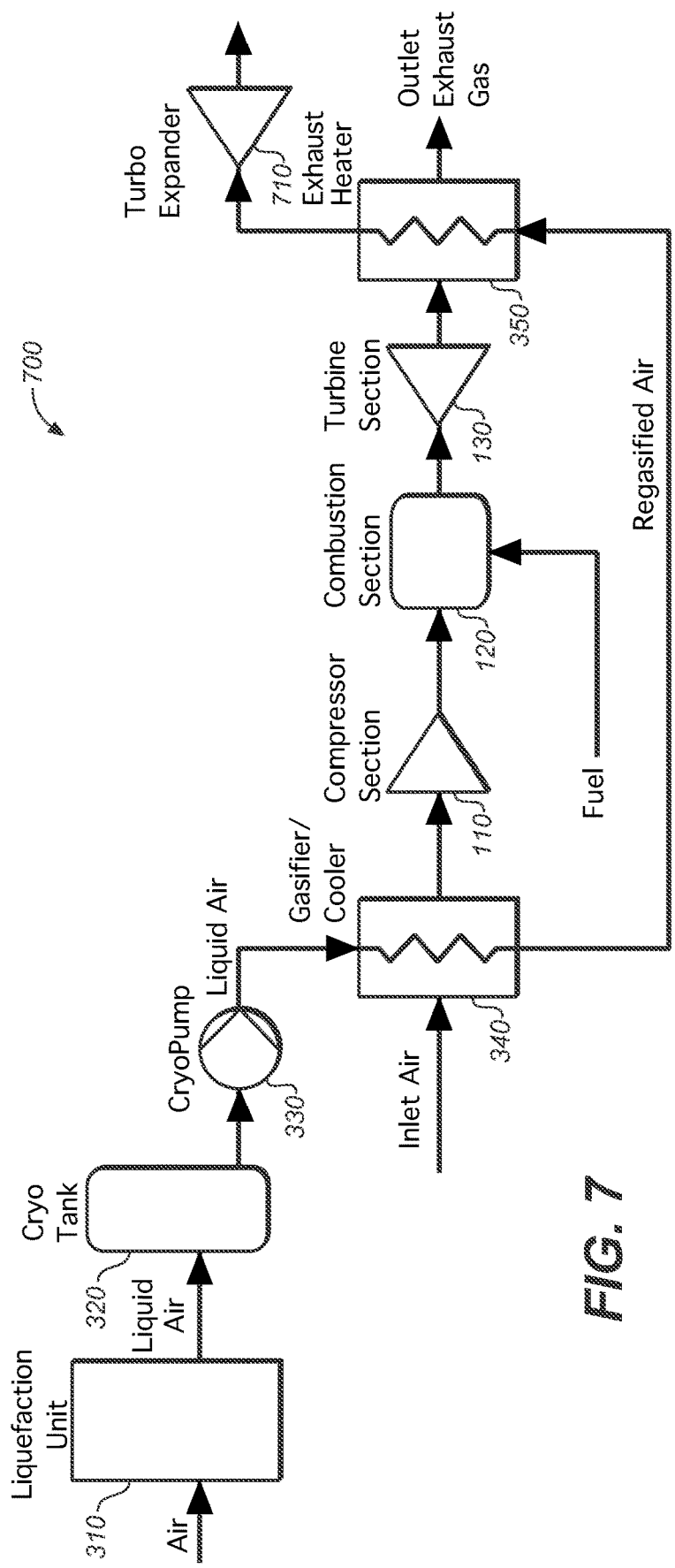
FIG. 7 shows a block diagram of another example cryogenic liquid air energy storage system incorporating the combustion turbine generator of FIG. 1. In this example liquid air is regasified by cooling inlet air to the compressor, further heated by turbine exhaust, and then expanded in a separate heat engine.

Liquid air gasified by inlet air cooling of a conventional combustion turbine may be further heated with exhaust gas from the combustion turbine, and then expanded in an engine to generate power. The engine may be a turbine or a two stroke reciprocating engine, for example. Multiple stages of expansion could be used, with or without reheating between stages by the combustion turbine exhaust gas. In example cryogenic liquid energy storage system 700 shown in FIG. 7, the regasified liquid air is further heated in heater 350 with heat from the exhaust of turbine 130, and then expanded through turbine 710.

Figure 8:
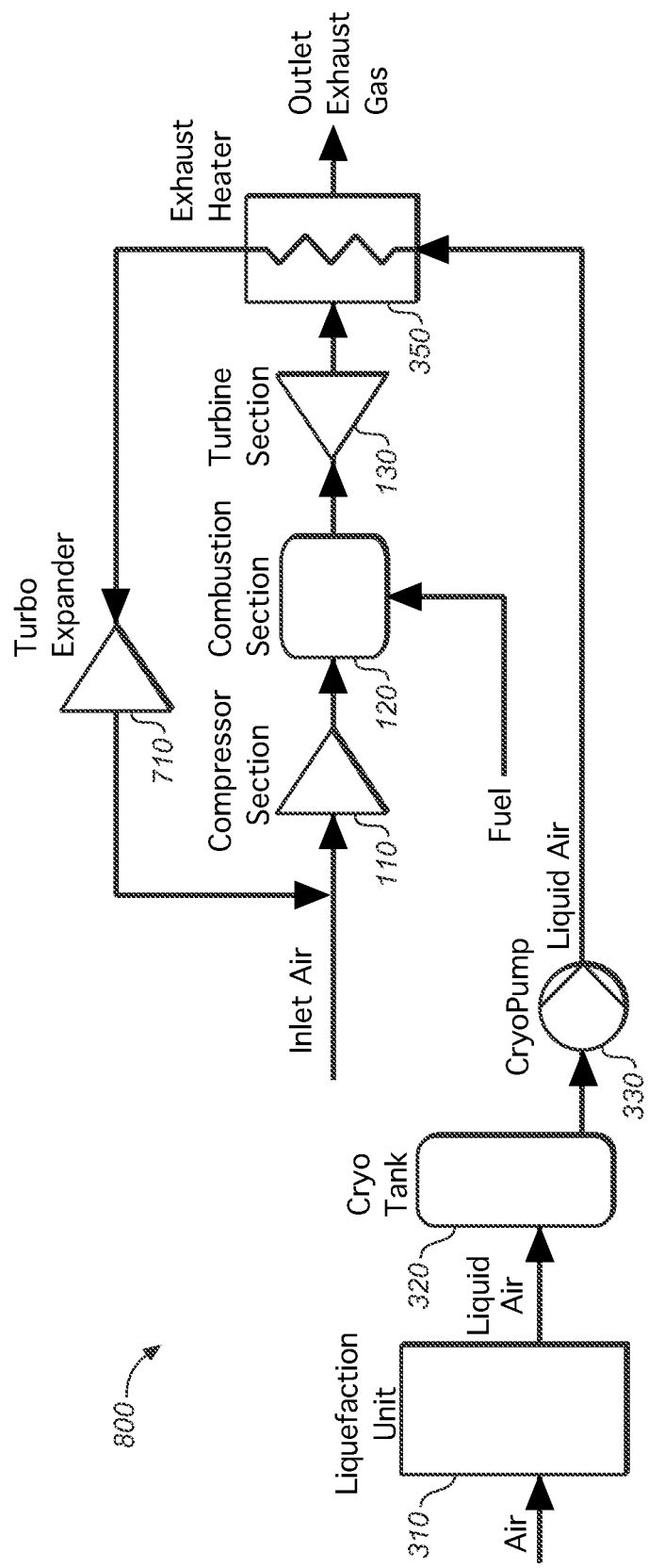
FIG. 8 shows a block diagram of another example cryogenic liquid air energy storage system incorporating the combustion turbine generator of FIG. 1. In this example liquid air is pressurized, regasified using exhaust heat from a combustion turbine, cooled by expansion through another heat engine to generate power, and then mixed with inlet air to the combustion turbine to provide direct cooling of the combustion turbine generator inlet air.

In example cryogenic liquid energy storage system 800 shown in FIG. 8, liquid air is pressurized, regasified in heater 350 using exhaust heat from combustion turbine 130, and then expanded through another heat engine (turbine 710) to generate power. The expanded air exhausted from turbine 710, which is cooled by the expansion process, is then mixed with inlet air to the combustion turbine to provide direct cooling of the combustion turbine generator inlet air.

The following enumerated clauses provide additional non-limiting aspects of the disclosure.

1. A method of storing and recovering energy, the method comprising:

regasifying liquid natural gas to gaseous form by heat exchange with inlet air to a compressor, thereby cooling the inlet air;

compressing the inlet air with the compressor and introducing the compressed inlet air into a combustor;

introducing the gaseous natural gas into the combustor and combusting it with the compressed inlet air to form a hot gaseous working fluid; and expanding the hot gaseous working fluid through a turbine.

2. The method of clause 1, comprising producing electricity with a generator driven by the turbine.

3. The method of clause 1 or clause 2, comprising further heating the gaseous natural gas before introducing it into the combustor.

4. The method of any of clauses 1-3, comprising further heating the gaseous natural gas with heat from exhaust gas from the turbine before introducing it into the combustor.

5. The method of any of clauses 1-4, comprising producing the liquid natural gas with an electrically powered liquefaction process and storing the liquid natural gas.

6. A method of storing and recovering energy, the method comprising:

regasifying liquid air or liquid air components by heat exchange with inlet air to a compressor, thereby cooling the inlet air;

compressing the inlet air with the compressor and introducing the compressed inlet air into a combustor;

introducing the regasified liquid air or liquid air components into the combustor;

introducing a fuel into the combustor and combusting it with the compressed inlet air and with the regasified liquid air or liquid air components to form a hot gaseous working fluid; and expanding the hot gaseous working fluid through a turbine.

7. The method of clause 6, comprising producing electricity with a generator driven by the turbine.

8. The method of clause 6 or clause 7, comprising further heating the regasified liquid air or liquid air components before introducing the regasified liquid air or liquid air components into the combustor.

9. The method of any of clauses 6-8, comprising further heating the regasified liquid air or liquid air components with heat from exhaust gas from the turbine before introducing the regasified liquid air or liquid air components into the combustor.

10. The method of clause 9, comprising matching the temperature of the regasified liquid air or liquid air components to the temperature of the compressed inlet air exiting the compressor.

11. The method of any of clauses 6-10, comprising introducing the regasified liquid air or liquid air components into a path to the combustor through compressor bleed ports, compressor discharge flanges, steam injection ports, or fuel nozzles.

12. The method of any of clauses 6-11, comprising producing the liquid air or liquid air components with an electrically powered liquefaction process and storing the liquid air or liquid air components.

13. A method of storing and recovering energy, the method comprising:
regasifying liquid air or liquid air components to produce gaseous air or gaseous air components using heat from exhaust gas from a first turbine;
regasifying liquid natural gas to produce gaseous natural gas using heat from exhaust gas from the first turbine;
combusting the gaseous natural gas with the gaseous air or gaseous air components to form a gaseous primary working fluid at an elevated temperature; and expanding the primary working fluid through the first turbine.

14. The method of clause 13, comprising producing electricity with a generator driven by the first turbine.

15. The method of clause 13 or clause 14, comprising heating a secondary working fluid with heat from the first turbine exhaust gas to convert the secondary working fluid from a liquid to a gas phase, expanding the gaseous secondary working fluid through a second turbine, and condensing the secondary working fluid from gas phase to liquid phase by transferring heat from the secondary working fluid to the liquid natural gas and to the liquid air or liquid air components during regasification of the liquid natural gas and regasification of the liquid air or liquid air components.

16. The method of clause 15, comprising producing electricity with a first generator driven by the first turbine and with a second generator driven by the second turbine.

17. The method of clause 15 or clause 16, wherein the secondary working fluid is an organic working fluid.

18. The method of any of clauses 13-17, comprising producing the liquid air or liquid air components with an electrically powered liquefaction process and storing the liquid air or liquid air components.

19. The method of any of clauses 13-18, comprising producing the liquid natural gas with an electrically powered liquefaction process and storing the liquid natural gas.

20. A method of storing and recovering energy, the method comprising:
regasifying liquid air or liquid air components by heat exchange with inlet air to a compressor, thereby cooling the inlet air;
compressing the inlet air with the compressor and introducing the compressed inlet air into a first combustor;
introducing a fuel into the first combustor and combusting it with the compressed inlet air to form a first hot gaseous working fluid;
expanding the first hot gaseous working fluid through a first turbine;
introducing the regasified liquid air or liquid air components into a second combustor;
introducing a fuel into the second combustor and combusting it with the regasified liquid air or regasified liquid air components to form a second hot gaseous working fluid; and
expanding the second hot gaseous working fluid through a second turbine.

21. The method of clause 20, comprising producing electricity with a first generator driven by the first turbine and with a second generator driven by the second turbine.

22. A method of storing and recovering energy, the method comprising:
regasifying liquid air or liquid air components by heat exchange with inlet air to a compressor, thereby cooling the inlet air;
compressing the inlet air with the compressor and introducing the compressed inlet air into a combustor;
introducing a fuel into the combustor and combusting it with the compressed inlet air to form a hot gaseous working fluid;
expanding the hot gaseous working fluid through a turbine; further heating the regasified liquid air or liquid air components with heat from exhaust gas from the turbine; and
expanding the heated regasified liquid air or liquid air components through at least one stage of expansion in an engine.

23. The method of clause 22, comprising producing electricity with a first generator driven by the turbine and with a second generator driven by the engine.

24. The method of clause 22 or clause 23 wherein the engine is or comprises a turbine.

25. The method of clause 22 or clause 23, wherein the engine is or comprises a two stroke reciprocating engine.

26. The method of any of clauses 22-25, comprising expanding the heated regasified liquid air or liquid air components through two or more stages of expansion in the engine, and reheating the liquid air or liquid air components with heat from the first turbine exhaust gas stream between expansion stages.

27. A method of storing and recovering energy, the method comprising:
regasifying liquid air or liquid air components to produce gaseous air or gaseous air components using heat from exhaust gas from a turbine;
expanding the regasified liquid air or liquid air components through at least one stage of expansion in an engine;
mixing the expanded regasified liquid air or liquid air components with inlet air to a compressor to form an air mixture;
compressing the air mixture with the compressor and introducing the compressed air mixture into a combustor;
introducing a fuel into the combustor and combusting it with the compressed air mixture to form a hot gaseous working fluid; and
expanding the hot gaseous working fluid through the turbine.

28. The method of clause 27, comprising producing electricity with a first generator driven by the turbine and with a second generator driven by the engine.

29. The method of clause 27 wherein the engine is or comprises a turbine.

30. The method of clause 27, wherein the engine is or comprises a two stroke reciprocating engine.

31. The method of any of clauses 27-30, comprising expanding the heated regasified liquid air or liquid air components through two or more stages of expansion in the engine, and reheating the liquid air or liquid air components with heat from the first turbine exhaust gas stream between expansion stages.

This disclosure is illustrative and not limiting. Further modifications will be apparent to one skilled in the art in light of this disclosure and are intended to fall within the scope of the appended claims.

TABLE 1

Performance of CTG with inlet air cooling

| LM6000 SPRINT PC estimates | 15 C. inlet air | 40 C. inlet air | Cooled by LNG | Cooled by Liquid Air |
|---|---|---|---|---|
| Compressor Inlet Flow ($m^3$/s) | 101.88 | 101.88 | 101.88 | 101.88 |
| Compressor Inlet Flow (kg/s) | 124.9 | 114.9 | 119.315 | 124.9 |
| Compressor Pressure Ratio | 30.8 | 28.25 | 29.43 | 32.63 |
| Compressor Inlet Temperature (C.) | 15 | 40 | 22.5 | 15 |
| Turbine Inlet Temperature (C.) | 1243 | 1243 | 1243 | 1243 |
| Turbine Inlet Flow ($m^3$/s) | 17.66 | 17.65 | 17.65 | 17.65 |
| Turbine Outlet Temperature (C.) | 468 | 482 | 475 | 459 |
| Net Generator Power (MW) | 47.43 | 38.98 | 44.12 | 53.8 |
| Fuel Flow (MW) | 112.1 | 97.3 | 108.2 | 123.3 |
| Efficiency | 42.3% | 40.0% | 40.8% | 43.6% |
| HHV Heat Rate (kJ/kWh) | 8510 | 8991 | 8827 | 7822 |

What is claimed is:

1. A method of storing and recovering energy, the method comprising:
   regasifying liquid air or liquid air components to produce gaseous air or gaseous air components using heat from an exhaust gas stream from a turbine;
   expanding the regasified liquid air or liquid air components through at least one stage of expansion in an engine without combusting the regasified liquid air or liquid air components;
   mixing the expanded regasified liquid air or liquid air components with inlet air to a compressor to form an air mixture;
   compressing the air mixture with the compressor and introducing the compressed air mixture into a combustor;
   introducing a fuel into the combustor and combusting it with the compressed air mixture to form a hot gaseous working fluid; and
   expanding the hot gaseous working fluid through the turbine to form the exhaust gas stream from the turbine.

2. The method of claim 1, comprising pumping the liquid air or liquid air components to higher pressure prior to regasifying the liquid air or liquid air components.

3. The method of claim 1, wherein mixing the expanded regasified liquid air or liquid air components with inlet air to a compressor to form an air mixture cools the inlet air.

4. The method of claim 1, wherein the air mixture is denser than the inlet air.

5. The method of claim 1, comprising producing electricity with a first generator driven by the turbine and with a second generator driven by the engine.

6. The method of claim 1, wherein the engine is or comprises a turbine.

7. The method of claim 1, wherein the engine is or comprises a two stroke reciprocating engine.

8. The method of claim 1, comprising expanding the heated regasified liquid air or liquid air components through two or more stages of expansion in the engine, and reheating the liquid air or liquid air components with heat from the first turbine exhaust gas stream between expansion stages.

9. The method of claim 1, comprising producing the liquid air or liquid air components with an electrically powered liquefaction process and storing the liquid air or liquid air components.

10. The method of claim 9, comprising:
    producing the liquid air or liquid air components with the electrically powered liquefaction process during a first time period in which the cost of electricity is a first price;
    and producing electricity with a first generator driven by the turbine and with a second generator driven by the engine during a second time period, after the first time period, in which the electricity generated by the first generator and the second generator may be sold at a second price greater than the first price.

11. The method of claim 10, wherein the engine is or comprises a turbine.

12. The method of claim 11, wherein mixing the expanded regasified liquid air or liquid air components with inlet air to a compressor to form an air mixture cools the inlet air.

13. The method of claim 11, wherein the air mixture is denser than the inlet air.

14. The method of claim 10, wherein the engine is or comprises a two stroke reciprocating engine.

15. The method of claim 14, wherein mixing the expanded regasified liquid air or liquid air components with inlet air to a compressor to form an air mixture cools the inlet air.

16. The method of claim 14, wherein the air mixture is denser than the inlet air.

* * * * *